United States Patent [19]
Kunz

[11] 3,786,678
[45] Jan. 22, 1974

[54] FORCE MEASURING APPARATUS INCLUDING ELECTROMAGNETIC LOAD COMPENSATION

[75] Inventor: Peter Kunz, Meilen, Switzerland

[73] Assignee: Mettler Instrumente, AG, Zurich, Switzerland

[22] Filed: Feb. 2, 1972

[21] Appl. No.: 222,960

[30] Foreign Application Priority Data
Apr. 5, 1971 Switzerland.......................... 5006/71

[52] U.S. Cl................. 73/141 R, 177/210, 177/212
[51] Int. Cl. .............................................. G01l 1/08
[58] Field of Search 73/141 R, 517 B; 177/210, 212

[56] References Cited
UNITED STATES PATENTS

| | | | |
|---|---|---|---|
| 3,028,550 | 4/1962 | Naydan et al...................... | 73/517 B |
| 3,545,284 | 12/1970 | Clement et al.................... | 73/517 B |
| 3,152,485 | 10/1964 | Lones et al......................... | 73/517 B |
| 3,186,504 | 6/1965 | Van Wilgen........................ | 177/210 |
| 3,237,449 | 3/1966 | Brandt .............................. | 73/141 R |
| 3,372,579 | 3/1968 | Hobel et al. ...................... | 73/141 R |

FOREIGN PATENTS OR APPLICATIONS
236,055   6/1969   U.S.S.R............................... 177/210

Primary Examiner—Charles A. Ruehl
Attorney, Agent, or Firm—Lawrence E. Laubscher

[57] ABSTRACT

Force measuring apparatus of the type including electromagnetic load compensation means for returning a load-responsive movable member to its initial no-load position relative to a housing. Load compensating pulses of constant amplitude are supplied to a load compensating coil that is connected with the movable member, the length of said pulses being varied as a function of the extent of the displacement of the movable member from its initial position as determined by position sensing means. The invention is characterized by the provision of means for supplying high frequency pulses from an oscillator to a counter only during periods corresponding with the length of said load compensating current pulses.

10 Claims, 2 Drawing Figures

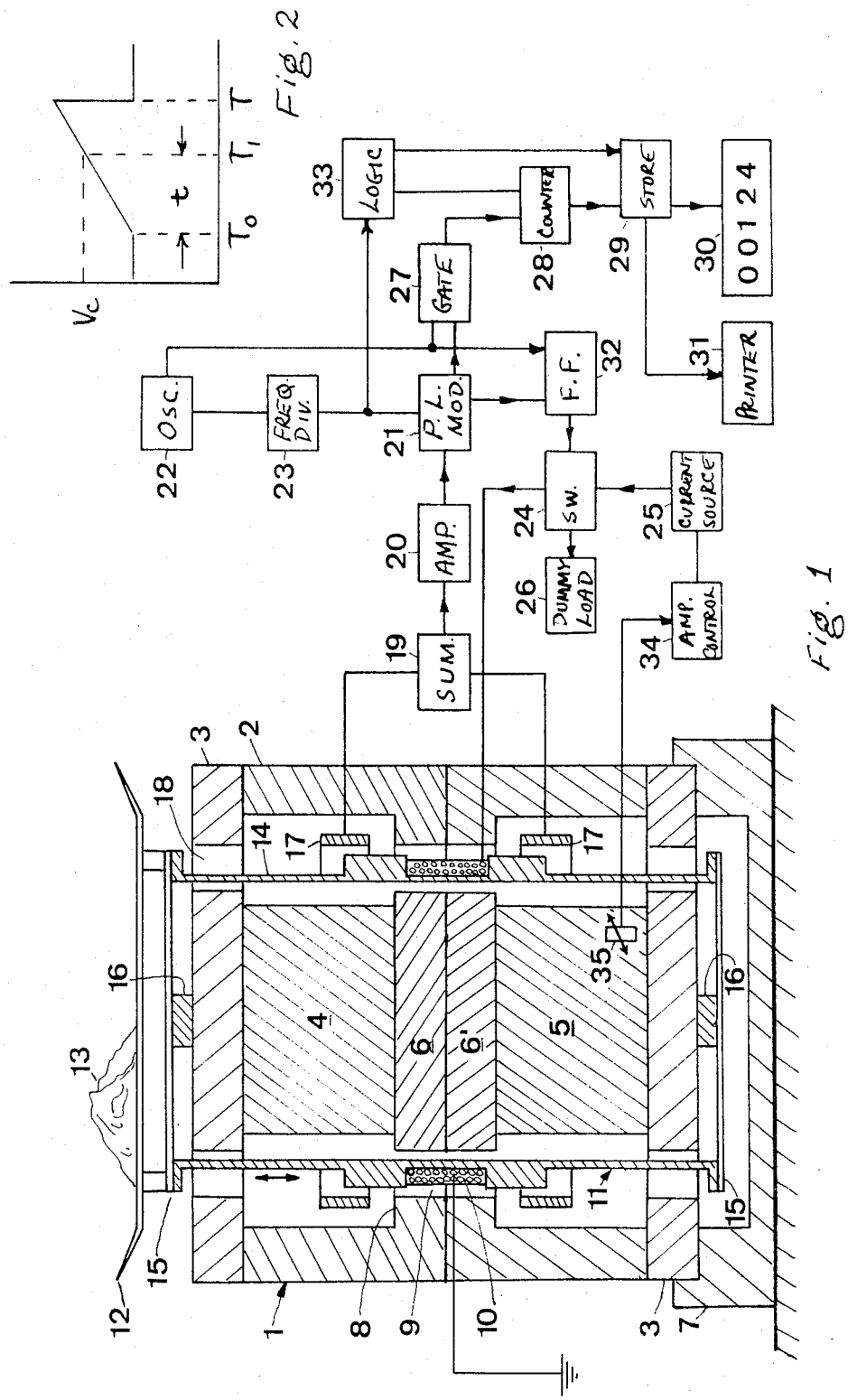

FORCE MEASURING APPARATUS INCLUDING ELECTROMAGNETIC LOAD COMPENSATION

This invention relates generally to an improved force measuring apparatus, and more particularly to a gravimetric apparatus of the type including electromagnetic compensation means for returning a force-responsive member to its initial no-load condition, the current supplied to said compensation means being in the form of pulses representative of the force to be measured.

It is known in the balance beam type of measuring apparatus to apply the force to be measured to one end of the beam, the aforementioned electromagnetic compensating means being disposed at the other end of the beam.

Known force-measuring devices with a balance beam suffer from several fundamental drawbacks, for which reason a number of beamless constructions have also already been proposed (for example, the balances disclosed in the British Pat. No. 919,771 or the German Offenlegungschrift No. 1,474,603). The known constructions of this kind however all include compensation devices which use direct current for compensation purposes.

In order to meet the requirement for digital indication of the measured value and at the same time to keep the expenditure required for that purpose as low as possible, beam balances have already been proposed in which current pulses of equal amplitude and length are supplied to the compensation coil, which pulses are counted and form a digital indication of the force to be measured (German Pat. No. 1,194,167). However, a certain difficulty arises in that there is no certain way of keeping the amplitude and length of the compensation current pulses precisely constant, which precise constancy is a necessary condition for alleviating measuring errors. Also, only limited resolution is possible by direct counting of the compensation current pulses.

A primary object of the present invention is to provide an improved force-measuring apparatus of the electromagnetic load compensating type, wherein the load compensating current comprises pulses of uniform amplitude, the lengths of said pulses corresponding with the extent of displacement of the force responsive movable member from its no-load position. Measuring means are provided for indicating the magnitude of the force to be measured, said measuring means including oscillator means for supplying high fequency counting pulses, and means for supplying said counting pulses to a counter only during periods that correspond with the length of the load compensating current pulses.

A more specific object of the invention is to provide a force measuring apparatus of the type described above, including pulse length modulating means for comparing with a sawtooth voltage a control voltage that is produced by position sensing means as a function of the displacement of the movable member from its initial no-load position, the length of a given pulse corresponding with the period of time between the initiation of a sawtooth waveform and the time at which the sawtooth voltage reaches the control voltage.

Other objects and advantages of the invention will become apparent from a study of the following specification when viewed in the light of the accompanying drawing, in which:

FIG. 1 illustrates schematically the electrical circuit of the force measuring system of the present invention; and FIG. 2 is a voltage-time diagram that illustrates the operation of the pulse length modulator means.

Referring now to FIG. 1, the balance includes a fixed housing 1 comprising a pot magnet, said housing including a cylindrical hollow body portion 2 which is formed of ferromagnetic material and which is closed at its upper and lower ends by end closure portions 3 also formed of ferromagnetic material. The housing 1 also includes permanent magnets 4 and 5 which together with a core assembly 6 and 6' form the inner part of a magnet system. An annular base 7 formed of non-magnetic material supports the housing on a fixed supporting surface. The base 7 can be provided with adjusting members (not shown) for adjusting the balance position.

The cylindrical body portion 2 is provided with an inwardly directed annular projection 8 which is so dimensioned that between the projection 8 and the core assembly 6 and 6' there is defined an air gap 9 in which a compensation coil 10 is mounted for movement in a vertical direction. The coil 10 is carried by the movable balance member 11 which comprises a balance pan 12 that receives the material 13 to be weighed, and a system of four circumferentially-spaced axially-extending carrier bars 14. Each carrier bar 14 is resiliently connected with the housing 1 by means of upper and lower suspension means 15. Each suspension means 15 includes generally circular spring members each of which is secured at its outer end to the corresponding carrier bar 14, and at its inner end to the corresponding housing projection 16, thereby providing a parallel guide action for the movable balance member 11.

Rigidly supported within the housing 1 are a pair of stationary, annular, vertically-spaced capacitor electrodes 17 which cooperate with the middle portion of the movable member 11 to define the displacement sensing means.

The carrier bars 14 extend freely through the apertures 18 contained in the housing end closure walls 3.

As shown in the drawing, all the essential components of the balance are arranged symmetrically normal to the direction of movement of the weighting pan, relative to a centre plane. In addition to structural simplicity, this provides marked advantages as regards the magnetic field. A first advantage is that errors which are often inherent in asymmetrical arrangements, as regards varying sensitivity with changing load, no longer occur. It is known that when a current flows in the compensation coil 10, there is superimposed on the permanent magnetic field an electromagnetic field the strength of which depends on the strength of the coil current. Depending on the direction of movement of the coil 10 in the compensation stage, this second field will change the first field either additively or subtractively, thereby in any case, falsifying it. This systematic error, which is known as a retroaction and which increases quadratically with the coil current strength, can now be completely eliminated by the symmetrical arrangement of the pot magent 2 and the magnets 4 and 5, as the above described effects cancel each other out in the upper and the lower halves of the system.

A further advantage results from the fact that with the symmetrical arrangement illustrated, the leakage field loss of the magnetic field is substantially smaller than in the case of the asymmetrical arrangement. Consequently, with given dimensions, the effective magnetic field is stronger, and thus the strength of the current in the compensation coil 10 can be reduced accordingly, which in turn results in a smaller temperature rise and thus smaller temperature-induced errors. Moreover, the danger of a weighing error which would otherwise occur when weighing ferromagnetic material, due to the influence of the leakage field, is reduced.

The symmetrical arrangement illustrated also means that influences owing to temperature variations are considerably reduced. As changes in the length of the system due to variation in temperature have an approximately uniform effect on the upper and the lower resilient suspension means 15, the position of the movable portion 11 relative to the two capacitors 17 remains virtually unaltered, and thus there will be no change in the output signal of the sensing means.

The arrangement of the two spaced cylindrical or annular capacitor electrodes 17 of the sensing means in the vicinity of the center of the balance (considered in a vertical direction) and symmetrically relative thereto, affords still further advantages. On the one hand, a considerable change in length in the region of the movable portion 11, which is delimited by the position of the capacitor electrodes 17, would not have the effect of varying the resulting output signal of the sensing means, as the two individual changes cancel each other out. On the other hand, deflections from the co-axial position of the movable portion 11 relative to the annular capacitor electrodes 17, owing to the annular field, have less effect in interfering with the sensing signal than in the case of the hitherto conventional arrangements with plate capacitors.

The mode of operation of the above described apparatus is described hereinafter with reference to a weighing operation.

The balance is displaced from its zero position under the influence of the material 13 to be weighed, and the two capacitor electrodes 17 supply varied output signals which, after conversion in a transmitter or summation circuit 19, determine in a control or amplifier circuit 20 the value of a control voltage. This control voltage is supplied to a pulse length modulator 21 which periodically (in this case, every 2 ms) produces a sawtooth voltage which increases from zero linearly to a maximum value. Referring to FIG. 2, the time $T_o$ corresponds to the voltage zero, while the time T corresponds to the maximum voltage, which defines the weighing region. The beginning and the end of each period of two ms are controlled by a high-frequency oscillator 22 which produces pulses of a constant frequency of 1 MHz. These pulses are supplied to a frequency divider 23 which has an output frequency of 500 Hz, and from there to the pulse length modulator 21. The pulse length modulator 21 controls a switch 24 which passes direct current of the appropriate polarity from a constant current source or generator 25 alternately to the compensation coil 10 and to a dummy load 26. At the moment $T_o$, the current is switched to the compensation coil 10 and produces the electromagnetic compensation force which tends to return the movable portion 11 back to its zero position. When after a period $t$ the sawtooth voltage in the pulse length modulator 21 has reached the value of the control voltage, the current is passed to the dummy load 26 until the next period begins again at a fresh moment $T_o$, and so on.

In addition to the switch 24, the pulse length modulator 21 also controls a gate 27. The oscillator 22 supplies counting pulses of a frequency 1 MHz to the gate 27, which pulses act on a counter 28 during the period $t$ (compensation period), and thus count off the length of the compensation current pulses. The gate 27 is opened at the moment $T_o$ and closed again after the period $t$ has elapsed, when the condition of coincidence between control voltage and sawtooth voltage is reached, in each case synchronously with the actuation of the switch 24. A flip-flop 32 arranged between the pulse length modulator 21 and the switch 24 carries out the function of synchronization in such a way that upon coincidence between control voltage and sawtooth voltage in the pulse length modulator 21, it receives from the latter the release signal for switching over, but switching over will only occur after the input of the counting pulse just coming from the oscillator 22 has been terminated; the switching operation which is synchronized to always the same flank of the respective counting pulse provides optimum coincidence between the length of the compensation current pulse and the number of corresponding counting pulses.

The pulses which are counted during a measuring step, that is to say during the period $t$, are supplied to indication storage means 29 and from there to an indication device 30 (digital indication by means of Nixie tubes). When that occurs, an auxiliary logic circuit 33, under the control of the frequency divider 23, transmits an order for storage of the respective condition of counting. At the same time the results can be established in print by way of a connected printing means 31. Thus the results are presented in digital form, without counting the compensation current pulses themselves.

A further advantageous feature of the balance is also illustrated in the drawing. A resistance thermometer 35 is arranged in the interior of the balance and connected by way of a temperature measuring circuit 34 to the constant current source 25. When the temperature in the balance, and thus the field of the permanent magnet system, changes, the resistance thermometer 35 causes an adaptation of the strength of the current supplied by the constant current source 25, that is to say the amplitude of the compensation current pulses. In this way it is possible for measuring errors resulting from fluctuations in the magnetic field which are caused by temperature, to be almost completely eliminated in the range which is of practical interest.

Because the weighing time is extremely short, even when taking into account a settlement time for the balance of about 0.1 second, the above described balance is suitable in particular for series weighing operations in rapid succession, in laboratory and in production. With a resolution of the order of magnitude of $10^{-4}$, it meets most by far of the practical requirements.

To enlarge the field of application, it is readily possible to connect a computer, for example for the mathematical or statistical evalutation of the weighing operations.

In order to increase the measuring range, with the compensation current strength remaining the same, additional means such as compression springs can be provided, which when required can be brought into operative connection with the movable portion of the force-measuring apparatus.

While in accordance with the provisions of the Patent Statutes, the preferred form and embodiment of the invention has been illustrated and described, it will be apparent to those skilled in the art that many changes may be made without deviating from the inventive concepts.

What is claimed is:

1. Weighing apparatus, comprising
    A. stationary magnetic housing means (1);
    B. a movable member (11) connected for movement relative to said housing means, said movable member being displaceable, upon the application thereto of a load to be measured, away from a first position relative to said housing means;
    C. electromagnetic load compensating means for returning said movable member toward said first position, said load compensating means including
        1. compensating coil means (10) connected with said movable member;
        2. sensing means (17) connected with said housing for producing a control signal the magnitude of which is a function of the displacement of said movable member from said first position; and
        3. means operable by said sensing means for supplying to said compensating coil means current pulses of constant height and of a length that corresponds with the extent of displacement of said movable member from said first positon, said pulse supplying means including
            a. a current source (25);
            b. normally-open switch means (24) operable to connect said current source with said compensating coil;
            c. oscillator means (22) for producing relatively high frequency counting pulses;
            d. frequency divider means (23) connected with said oscillator means; and
            e. means including pulse length modulator means (21) connected with said sensing means and with said frequency divider means for periodically closing said switch means for periods corresponding with the magnitude of said control signal, whereby said compensating coil means is supplied with compensating current the magnitude of which corresponds with the displacement of said movable member from said first position; and
    D. means for indicating the magnitude of said load, comprising
        1. pulse counter means (28); and
        2. gate means (27) for connecting said oscillator means with said counter means only when said switch means is in the closed position, whereby the sum of the counting pulses supplied to said counter means affords a digital measurement of the weight of said load.

2. Apparatus as defined in claim 1, and further including resilient means fo supporting said movable member relative to said housing.

3. Apparatus as defined in claim 1, wherein said electromagnetic load compensating means includes permanent magnet means, said compensation coil and said permanent magnet means being of a substantially rotationally symmetrical construction.

4. Apparatus as defined in claim 3, and further including resilient means for supporting said movable member relative to said housing, said resilient means being of a substantially rotationally symmetrical construction.

5. Apparatus as defined in claim 4, wherein said permanent magent means is also of symmetrical construction relative to a plane normal to the direction of movement of said movable member.

6. Apparatus as defined in claim 5, wherein said sensing means comprises at least two annular capacitor electrodes arranged in colinearly spaced relation relative to the direction of movement of said movable member.

7. Apparatus as defined in claim 1, and further including temperature compensation means for compensating for temperature influences that would otherwise tend to falsify a measured result.

8. Apparatus as defined in claim 7, wherein said temperature compensation means comprises temperature-responsive variable resistor means for varying the amplitude of said load compensating current pulses as a function of temperature.

9. Apparatus as defined in claim 1, and further including flip-flop means (32) for preventing operation of said switch means from its closed condition to its open condition during those periods that a counting pulse is being formed by said oscillator means, said flip-flop means having a pair of input terminals connected with said pulse length modulator means and with said oscillator means, respectively, and an output terminal connected with said switch means.

10. Apparatus as defined in claim 1, wherein said indicating means includes means (30) presenting a visible indication of the sum of the counting pulses supplied to said counter means via said gate means.

* * * * *

Disclaimer and Dedication 3,786,678.—*Peter Kunz*, Meilen, Switzerland. FORCE MEASURING APPARATUS INCLUDING ELECTROMAGNETIC LOAD COMPENSATION. Patent dated Jan. 22, 1974. Disclaimer filed Apr. 13, 1977, by the assignee, *Mettler Instrumente AG*.

Hereby disclaims and dedicates to the Public claims 1–10 of said patent.

[*Official Gazette June 7, 1977.*]